United States Patent
Hicks et al.

(10) Patent No.: US 11,301,358 B1
(45) Date of Patent: Apr. 12, 2022

(54) USING FALSE POSITIVES TO DETECT INCORRECTLY UPDATED CODE SEGMENTS

(71) Applicant: International Business Machines Corporation, Armonk, NY (US)

(72) Inventors: Andrew C. M. Hicks, Wappingers Falls, NY (US); Michael E Gildein, Wappingers Falls, NY (US); Michael Terrence Cohoon, Fishkill, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/121,795

(22) Filed: Dec. 15, 2020

(51) Int. Cl.
*G06F 9/44* (2018.01)
*G06F 11/36* (2006.01)
*G06N 7/00* (2006.01)
*G06F 8/41* (2018.01)
*G06F 8/71* (2018.01)

(52) U.S. Cl.
CPC .......... *G06F 11/3608* (2013.01); *G06F 8/433* (2013.01); *G06F 8/71* (2013.01); *G06F 11/3616* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 6,282,698 B1 * | 8/2001 | Baker | G06F 8/75 717/118 |
| 8,214,340 B2 | 7/2012 | Szyperski et al. | |
| 8,495,100 B2 | 7/2013 | Cheung | |
| 8,881,103 B2 | 11/2014 | Bak et al. | |
| 9,141,378 B2 | 9/2015 | Fox et al. | |
| 9,690,553 B1 * | 6/2017 | Brodie | G06F 8/71 |
| 10,585,780 B2 | 3/2020 | Woulfe et al. | |
| 2010/0287528 A1 * | 11/2010 | Lochmann | G06F 8/74 717/104 |
| 2012/0036497 A1 | 2/2012 | Karthik et al. | |

(Continued)

OTHER PUBLICATIONS

T.M. Luong et al., "Hidden Markov Model Applications in Change-Point Analysis", Dec. 2012 (Year: 2012).*

*Primary Examiner* — Wei Y Zhen
*Assistant Examiner* — Lanny N Ung
(74) *Attorney, Agent, or Firm* — Cantor Colburn LLP; Teddi Maranzano (57) ABSTRACT

Aspects of the invention include receiving a notification that a first logical grouping of code segments of a software application is being changed. Comparing the first logical grouping to a second logical grouping of code segments from a change history of the software application, where the first logical grouping and the second logical grouping both relate to resolving a common software application issue, and where the first logical grouping and the second logical grouping include at least one common code segment. Identifying a first code segment of the first logical grouping that is different from a second code segment of the second logical grouping. Determining that given the at least one code segment is changed a probability that the second code segment has been changed is greater than an threshold value. Sending a notification based on the difference in the probabilities being greater than a threshold value.

15 Claims, 6 Drawing Sheets

(56) References Cited

U.S. PATENT DOCUMENTS

| | | | |
|---|---|---|---|
| 2012/0079452 A1* | 3/2012 | Nir-Buchbinder | G06F 8/33 |
| | | | 717/113 |
| 2014/0359584 A1* | 12/2014 | Chu | G06F 8/70 |
| | | | 717/131 |
| 2016/0306612 A1 | 10/2016 | Hewitt et al. | |
| 2019/0347424 A1* | 11/2019 | Bezzi | G06F 21/577 |

* cited by examiner

| | % | ε |
|---|---|---|
| AB | 80% | 10% |
| ABC | 60% | 100% |
| ABD | 30% | 70% |
| ABDG | 30% | 100% |

USING FALSE POSITIVES TO DETECT INCORRECTLY UPDATED CODE SEGMENTS

BACKGROUND

The present invention generally relates to programmable computing systems, and more specifically, to programmable computing systems configured to use false positives to detect incorrectly updated code segments.

During a lifecycle of a software development application, software developers are tasked with resolving errors or improving the efficiency of the application. Developers utilize applications, such as an integrated development environment (IDE), that provide user interfaces that enable developers to modify source code segments and execute the modified segments. Modern day software applications are a set of interrelated programming modules, in which complex code segments are written such that a code segment of one module is dependent on a code segment of another module. Therefore, if a developer modifies a code segment, the modification can directly impact the execution of the related code segment. To account for these dependencies between code segments, software developers not only have to modify the code segments that are directly related to an issue, but also any related code segments.

SUMMARY

Embodiments of the present invention are directed to using false positives to detect incorrectly updated code segments. A non-limiting example computer-implemented method includes receiving a notification that a first logical grouping of code segments of a software application is being changed. Comparing the first logical grouping to a second logical grouping of code segments from a change history of the software application, where the first logical grouping and the second logical grouping both relate to resolving a common software application issue, and where the first logical grouping and the second logical grouping include at least one common code segment. Identifying a first code segment of the first logical grouping that is different from a second code segment of the second logical grouping. Determining that given the at least one code segment is changed a probability that the second code segment has been changed is greater than a threshold value. Sending a notification based on the difference in the probabilities being greater than a threshold value.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products that detect sets of code segments of a software application that are being updated. The sets are compared to previous sets of code segments that have been updated for a common software application. A determination is made as to whether the optimum set of code segments is being changed.

Software developers generally follow established patterns when resolving issues for a software application. If a certain class of issue arises, most developers will modify the common (same) code segments for the common (same) family or unit of modules. A module is a set of code segments of an application designed to perform an application function. For example, if the issue is modifying an application process, most developers will modify a module for definitions, variables, and global structures; a module for the main source code; and a module for the RESTful application programming interface accessing the main code. However, as new software versions are implemented, or new techniques are developed, the conventional combination of modules to update needs to be changed.

In practice, software manufacturers issue reports that identify software issues and provide workarounds to resolve known issues. The report can include a list of code segments to modify to resolve issue x (e.g., code segments A, B, and C). An example of such a report is an IBM Authorized Program Analysis Report (APAR). However, as time passes, the software distributor may release version 2.0 of the application. However, software developers may still be relying on the previous workaround and resolving issue x by modifying A, B, and C, when due to the version change, they should have modified A, B, and D. In many instances, version 2.0 of the application is configured such that modifying A, B, and C either does not resolve the issue or it creates new issues. For example, the developers may have solved issue x for software application version 2.0, but created issue y.

One or more embodiments of the present invention address one or more of the above-described shortcomings by providing computer-implemented methods, computing systems, and computer program products that detect sets of code segments of a software application that are being updated. The sets are compared using a Markov analysis to previous sets of code segments that have been updated for a common software application. A determination is made as to whether each code segment of the logical grouping of code segments should be changed, or if another combination of code segments should be changed. As a result, the developers will not change code segments that should remain unchanged. In this sense, even if developers have been provided a workaround that instructs them to change a logical grouping of code segments, the system can alert the developers that the logical grouping is not the best choice of code segments to change. Therefore, developers can save time and maintain product quality by not having to undo what an outdated workaround instructed them to do.

Figure 1:
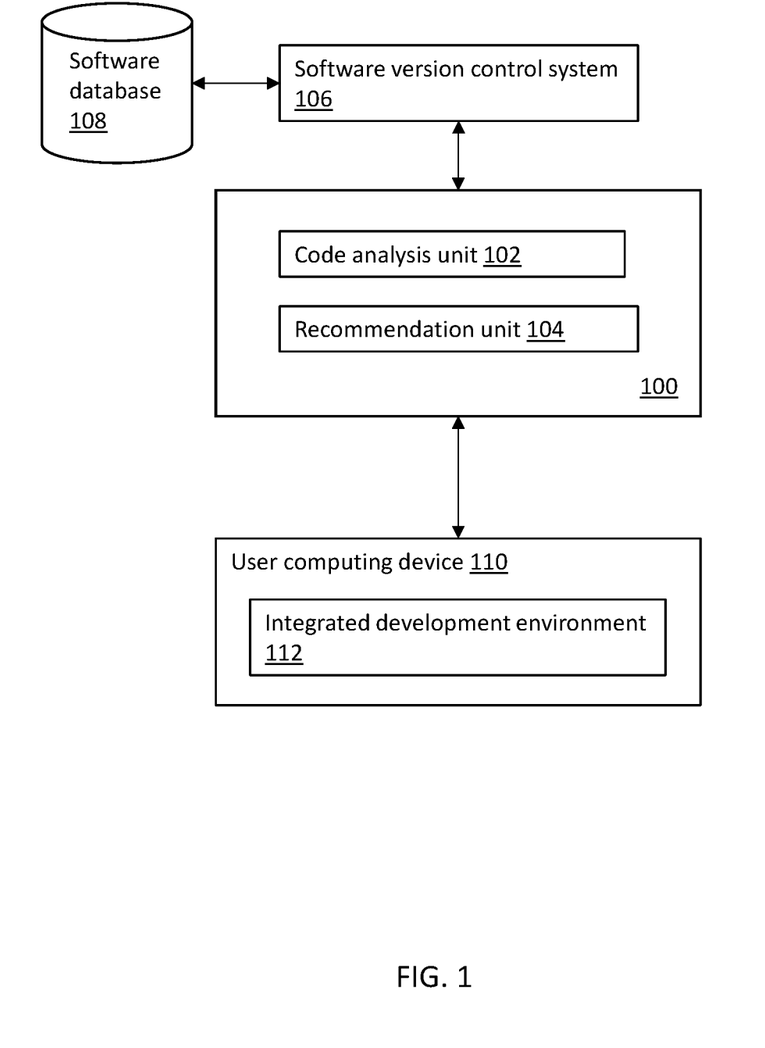
FIG. 1 illustrates a block diagram of components of using false positive to detect incorrectly updated code segments in accordance with one or more embodiments of the present invention.

Turning now to FIG. 1, a system 100 for identifying a code segment(s) from a logical grouping that should not be changed is generally shown in accordance with one or more embodiments of the present invention. The system 100 includes a code analysis unit 102 for receiving a set of code segments that are being changed or being targeted for change and determining whether each code segment should be changed. The system 100 further includes a recommendation unit 104 for providing an alert to a developer, if it detects that one or more of the code segments should not be changed. The recommendation unit 104 further recommends one or more alternative code segments to update to resolve the issue. The system 100 is in operable communication with a software version control system that alerts the system 100 that one or more code segments are being changed. The software version control system 106 is in operable communication with a software database 108 for storing a record of sets of code segments previously changed together. The system 100 is further in operable communication with one or more user computing device(s) 110. Each user computing device 110 can further include an integrated development environment 112 application used by a developer to change the code segments of an application. It should be appreciated that the system 100 can be implemented via the computer system 600 described in FIG. 6

In accordance with one or more embodiments of the present invention, the code analysis unit 102 receives an alert that one or more code segments are being changed or will be changed in relation to a software application issue. For example, the code analysis unit 102 can be notified by developers who provide an identity of each code segment that they contemplate changing. Alternatively, the code analysis unit 102 can receive an alert from the software version control system 106 that one or more code segments are being changed. The alert can include an identifier of the code segment that is being changed and a time stamp for each change. The alert can further include an identification of the software application being modified, including the software version, a software application issue that is the reason for the changes, and a time stamp for the initiation of the changes.

The code analysis unit 102 determines whether one or more code segments that are being changed are part of a set (i.e., logical grouping) of code segments being changed to resolve an issue. The code analysis unit 102 receives an alert that code segments A and B are being changed along with respective time stamps of each change and an identification of the application being changed. The code analysis unit 102 compares the time stamps and determine whether the changes are within a threshold time interval. If the time interval between at least one time stamp for code segment A is less than the threshold time interval of a time stamp of code segment B, the code analysis unit 102 determines that code segments belong to a logical grouping. A logical grouping of code segments is assumed to relate to resolving a common (same) issue. If the time interval between at least one time stamp of change to code segment A is greater than the threshold time interval of a time stamp of a change to code segment B, or the software applications being changed do not match, the code analysis unit 102 determines that code segments a and B do not belong to the common logical grouping.

In accordance with one or more embodiments of the present invention, once the code analysis unit 102 has identified two or more code segments that the developers are changing or targeting for change, it determines whether each of the code segments should be changed. The code analysis unit 102 accesses a dependency graph that describes the relationship between code segments. Each node of the dependency graph represents a code segment. Each edge of the dependency graph represents a probability that a code segment described by the node is changed based on changing the code segments described by the connected nodes. For example, a dependency graph can include a path in which nodes A is connected to node B, which is connected to node C. Moving from A to B, the edge connecting node A and B describes the probability that code segment B is changed if code segment A is changed in relation to a particular issue. The edge connecting nodes B and C describes a probability that code segment C is changed if code segment A and B are changed in relation to the particular issue. If, in some instances, node B was also connected to node D, the edge between node B and D describes a probability that code segment D is changed if code segment A and B are changed in relation to the particular issue. The dependency graph can be generated based on change history stored on the software version control system 106 and be stored in the database 108.

The code analysis unit 102 compares the identification of the code segments that are being changed to code segments in the dependency graph. The code analysis unit 102 then determines whether a matching path is discovered based on a threshold number of nodes matching. The threshold number of nodes can be a dynamically calculated number based on the number of code segments that are being changed. For example, if three code segments are being changed or targeted for change, the threshold number can be two. If, however, six code segments are being changed or targeted for change, the threshold number can be four. A developer can encode the code analysis unit 102 with a set of rules to allow it to determine the threshold number of code segments.

Once the code analysis unit 102 has established a matching path of code segments, the code analysis unit 102 generates nodes for code segments being changed and overlays the generated nodes on the path found in the dependency graph. The code analysis unit 102 then determines if in either the path found in the dependency graph or in the overlay of the graph, there is a deviation in the paths. Returning to the example of a path in the dependency graph of nodes A, B, C, and D, in which nodes C and D are connected to node B, the code segments being changed can be A, B, and C, which are a logical grouping of code segments that the accepted workaround of an issue suggests to change. The code segments A, B, and D can be a logical grouping chosen by developers in the recent past, but not identified by the workaround.

The code analysis unit 102 determines whether developers should continue to change each code segment, or whether the developers should refrain from changing one or more of the code segments. Using the example above, the code analysis unit 102 analyzes the overlay and determine whether the developers should follow the accepted workaround path of changing code segments A, B, and C, or whether one or more of the code segments should not be changed. To make this determination, the code analysis unit 102 determines a difference between the path selected by the developers and other paths found in the dependency graph. The code analysis unit 102 enters the nodes and edges of the dependency graph as inputs of a Markov model. The Markov model is a stochastic model that describes the probability that each code segment is changed based on the previous code segments that have been changed in a finite state. The Markov model generates a transition matrix M (Markov matrix). This stochastic matrix can be n×n matrix, in which all of the entries are non-negative. Each of the columns are probability vectors, in which the probability is derived from the dependency matrix edges, and in which the sum of each column is one. A Markov chain is a string of probability vectors $x_0, x_1 \ldots x_n$, such that $x_{K+1}=Mx_k$.

The code analysis unit 102 then finds the steady state vector of the Markov matrix M The steady state vector of matrix M can be defined as an eigenvector w, that satisfies the equation Mw=w. In other words, it is the eigenvector for the eigenvalue $\lambda=1$. with eigenvalue 1, such that the entries of the matrix M have positive values and the sum of each of the columns is 1. The code analysis unit 102 receives the steady state vector and calculate the eigenvalues. The eigenvalues describe the strength of the relationships between the code segments. For example, the strength of the relationship between code segment A and code segment B can be described by an eigenvalue. As developers continue to change code segment A in combination with code segment B, the relationship increases and the increase is reflected by the eigenvalue. As developers stop changing code segment A in combination with code segment B, the pre-existing relationship between code segment A and code segment B decreases, which is also reflected in the eigenvalue. For each set of code segments, the code analysis unit 102 generates an eigenvector based on the associated eigenvalues. The code analysis unit 102 then maps each eigenvector to an eigenspace. For example, the code analysis unit 102 can map an eigenvector for a path that includes code segments A, B, and C to the eigenspace.

The recommendation unit 104 uses the eigenvectors to determine a distance between the logical grouping of code segments that the developers are changing and an alternative logical grouping of code segments from the dependency graph. For example, the distance between the logical grouping for code segments A, B, and C, and the logical grouping for code segments A, B, and D. The recommendation unit 104 maps the eigenvector to an eigenspace and calculate a delta Δ (a distance) between the eigenvectors. As the eigenvectors are based on probabilities that a code segment will be changed based on previous code segments, the distances between eigenvectors are dependent upon the actions of developers. If, for example, almost all developers choose to change a first logical grouping of code segments, then any deviation from that logical grouping will result in a large delta between eigenvectors. However, as time progresses and more developers choose to follow the deviation, the delta will decrease. Once the delta is below a threshold value, the recommendation unit 104 determines that future developers should change the code segments of the deviation logical grouping and not the first logical grouping. Eventually, the logical grouping of the deviation will be more probable than the first logical grouping. Various methods can be used to calculate the delta, for example, a cosine similarity algorithm can be used.

The recommendation unit 104 further monitors the eigenvectors to detect trends. For example, the recommendation unit 104 monitors a rate of change in the distance for a period of time in the past from the present. For example, the recommendation unit 104 analyzes a change in the distance within the past six months, past year, or past two years. The recommendation unit 104 further determines whether the rate of change in the distance is greater than a trending threshold rate of change.

For example, the developers may be changing a logical group of code segments that includes code segments A, B, and C. The closest logical grouping in the dependency graph can include A, B, and D, in which A is connected to B, and C and D are connected to B. The recommendation unit 104 determines that a distance between the eigenvectors representing the logical group of code segments A, B, and C and group A, B, and D are not greater than a first threshold apart. However, the recommendation unit 104 further determines that a rate of change in the distance between the eigenvectors is greater than a trending threshold. In this instance, the recommendation unit 104 issues an alert to the developers to change code segments A, B, and D instead of code segments A, B, and C.

Figure 2A:
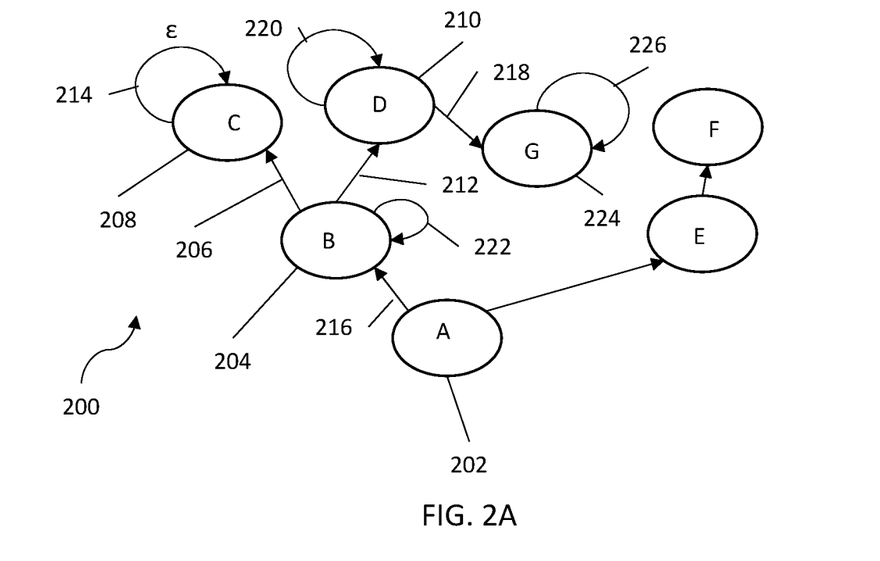
FIG. 2A illustrates a Markov chain for scoring in accordance with one or more embodiments of the present invention.

Referring to FIG. 2A, a dependency graph 200 according to an embodiment of the present invention is shown. The dependency graph 200 can be generated based on a change history of a particular software application. The change history can be stored in the database 108 and retrieved by the code analysis unit 102 via the software version control system 106. The change history includes an identifier of a code segment what has been changed, a time stamp of the change, a software issue necessitating the change, and other appropriate information. The dependency graph can include a plurality of nodes connected via a plurality of edges. Each node is representative of a code segment of a module, a code segment, or instructions. Each edge represents a relationship between interconnected nodes. In some embodiments of the present invention, each edge between nodes can be weighted to represent a probability that the connected nodes are updated together.

As illustrated, each time that a new code segment is changed, a node is generated. For example, as the code analysis unit 102 detects that code segment A is being changed, it generates node A 202 for the dependency graph. As a second code segment B is changed, the code analysis unit 102 generates a second node B 204. The nodes are connected by an edge 206 that describes a probability that code segment B is changed in combination with code segment A. The edge value can be calculated by counting the number of times code segment A and code segment B are updated together, and dividing the count by the number of times code segment A has been updated. The process is repeated for each subsequent code segment that is changed.

As illustrated, a developer has changed code segment C, thereby causing the code analysis unit 102 to create node C 208. However, the edge value is calculated by counting the number of times code segment A, code segment B, and code segment C are updated, and dividing the count by the number of times code segments A and B have been updated. Nodes A, B, and C is a logical grouping, in which a probability of each event (node) occurring is dependent upon a previous node. The logical grouping can be characterized as a Markov chain. Each time that code segment is changed, the code analysis unit 102 detects changed code segments and create new nodes. As seen, a developer has changed code segment D rather than code segment C after changing code segments A and B. In this instance, the nodes for code segments A and B have already been created, therefore, the code analysis unit 102 generates a node D 210 and connects node D 210 to node B 204 via an edge 212. In the initial instance that the developer chooses to change code segment D instead of C, a probability that a set will include nodes A, B, and D 202 204 210 will be small. The eigenvectors derived from the dependency graph contain information regarding both sets A, B, and C; and A, B, and D. Initially the eigenvectors will skew towards set A, B, C as it is the most common set of code segments to change. If, over time, more and more developers begin to choose set A, B, and D; then the eigenvectors will skew more and more towards node D. The dependency graph 200 further includes curved edges associated with a respective final state probability E that a logical grouping represents a final set. For example, curved edge 214 is associated with the probability E that the logical grouping of code segments A, B, and C are a final set. The respective probability c is determined based on historical data of code segment changes.

Figure 2B:
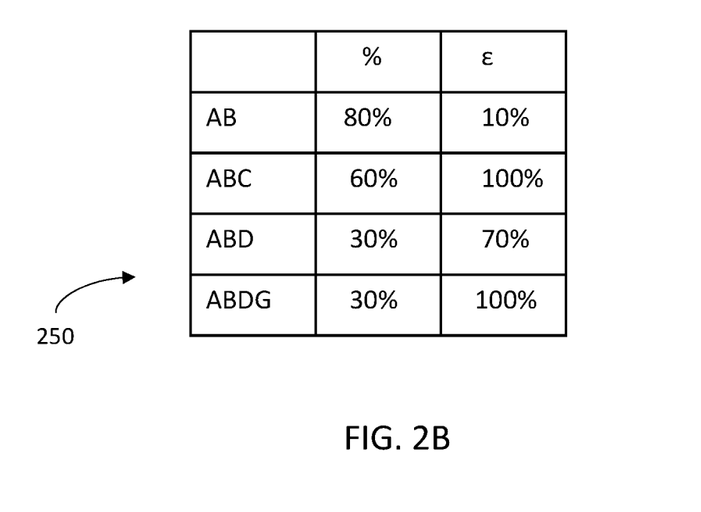
FIG. 2B illustrates an exemplary table of probabilities associated with edges of the Markov chain of FIG. 2A in accordance with one or more embodiments of the present invention.

Referring to FIG. 2B, an exemplary table 250 is shown describing the probabilities associated with the edges shown in FIG. 2A. It should be appreciated that the probabilities are identified for illustrative purposes only, and in practice the probabilities would be calculated based on historical data. The values of the first column of the table 250 signify the different possible logical groupings that the developers have historically updated. The logical groupings include codes segments A and B; code segments A, B, and C; code segments A, B, and D; and code segments A, B, D, and G. Code segments sets A and E; and A, E, and F were not included in the table, but are possible logical groupings. The values of the second column of the table 250 represent a probability associated with an edge of a code segment set. The values of the third column of the table 250 represent a final state probability E of each logical grouping.

As seen in the table 250, a probability associated with the edge 216 connecting Node A 202 and Node B 204 is eighty percent. The eighty percent value signifies that, based on historical data, if code segment A is changed, then eighty percent of the time code segment B is also changed. Although not included in the table, there is a twenty percent probability that the logical grouping alternatively includes code segment A and code segment E. The sum of the probabilities of each path from a node always equals one hundred percent. In ten percent of historical cases, if the developers update code segments A and B, they choose not to update any other code. Therefore, a final state probability c associated with the final state edge 222 is ten percent. The probability associated with the edge 206 connecting Node B 204 and Node C 208 is sixty percent. If the developers update code segments A, B and C, they have historically never updated any other code segments. Therefore, a final state probability c associated with the final state edge 214 is one hundred percent. The probability associated with the edge 212 connecting Node B 204 and Node D 210 is thirty percent. In seventy percent of historical cases, if the developers update code segments A, B, and D; they choose not to update any other code. Therefore, a final state probability c associated with the final state edge 220 is seventy percent. The probability associated with the edge 218 connecting Node D 210 and Node G 224 is thirty percent. If the developers update code segments A, B, D, and they have historically never updated any other code segments. Therefore, a final state probability c associated with the final state edge 226 is one hundred percent.

Figure 3:
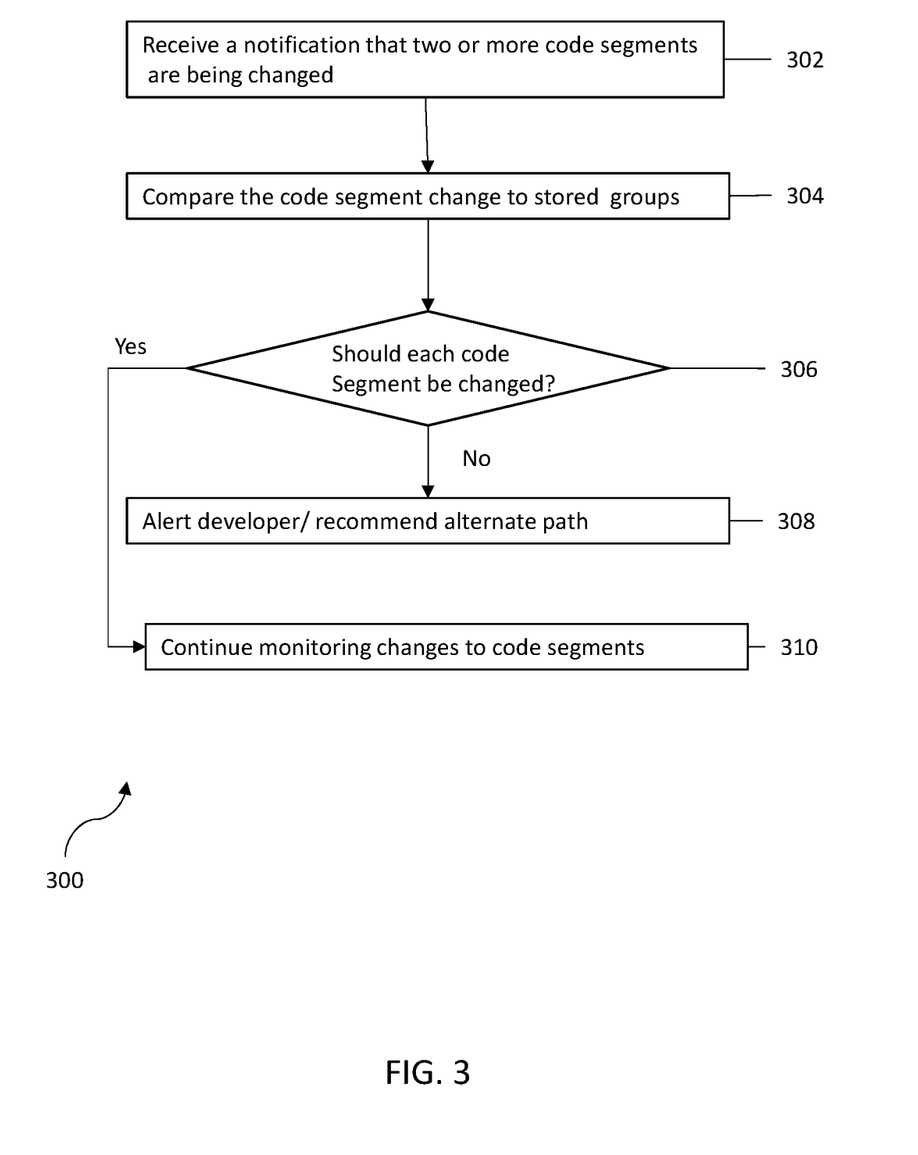
FIG. 3 illustrates a flow diagram of a process for using false positive to detect incorrectly updated code segments in accordance with one or more embodiments of the present invention.

Referring to FIG. 3, a flow diagram of a process for using false positives to detect incorrectly updated code segments according to embodiments of the present invention is shown. It should be appreciated that all or a portion of the processing shown in FIG. 3 can be performed by a computer system, such as system 100 of FIG. 1. At block 302 the code analysis unit 102 is notified that one or more code segments are being changed or will be changed. The one or more code segments can be a part of a logical group of code segments that are being changed to resolve an issue. The code analysis unit 102 can receive the notification manually from the developers. The code analysis unit 102 can also receive the notification automatically from a software version control system 106, that is alerted when a developer accesses an integrated development environment 112 to change a code segment. The notification can include an identification of code segment, a time stamp for any code changes, and an identification of the application that the code segment belongs to.

At block 304, the code analysis unit 102 compares the logical group of code segments to previously changed logical groups of code segments. In some embodiments of the present invention, the code analysis unit 102 compares the logical group to be changed with logical groups found in a dependency graph. The code analysis unit 102 continues to traverse the dependency graph until a threshold number of code segments of the logical group to be changed matches the threshold number of code segments in a logical group described by the dependency graph.

In some embodiments of the present invention, the code analysis unit 102 creates a dependency graph. The dependency graph can include nodes that describe code segments and edges that describe the probability that a code segments is changed based on a previous set of code segments that are changed. The code analysis unit 102 further enters the values for code segments to be changed, matching code segments from the dependency graph, and the connecting edges into a Markov model. The code analysis unit 102 further outputs a Markov matrix, calculates the eigenvectors of the matrix and maps them to an eigenspace.

At block 306, the recommendation unit 104 determines whether a distance between the eigenvector representing the code segments in the dependency graph is greater than a threshold distance from the eigenvector representing the code segments that are being changed. In particular, the recommendation unit 104 determines the distance between deviations between the code segments that are being changed and the code segments in the dependency graph. If the recommendation unit 104 determines that the distance between one or more code segments is greater than a threshold distance, it issues an alert to the developers at block 308.

The recommendation unit 104 further suggests an alternative code segment(s) to replace a code segment being changed or changed. In some embodiments of the present invention, the recommendation unit 104 retrieves the alternative code segment, for example, from the software database 108. The recommendation unit 108 further causes the alternative code segment to be displayed on the user computing device 110. For example, the alternative code segment can be displayed via the integrated development environment 112. The recommendation unit can cause the logical group of code segments to be displayed via an editor application with the alternative code segment replacing the original code segment. For example, the logical grouping that the developers are changing includes code segments A, B, and C. However, the recommendation unit 104 determines that the logical grouping should be code segments A, B, and D. Therefore, the recommendation unit 104 causes the code segments D to be displayed on an editor of the integrated development environment 112. In some embodiments of the present invention, the recommendation unit 104 further causes the integrated development environment to execute code segment D, such that any error is displayed via the editor. If, however, the recommendation unit 104 determines that the distance is less than the threshold distance, it does not issue an alert at block 308, and instead continues to block 310.

In some embodiments of the present invention, the recommendation unit 104 further analyzes the final state probability c of the logical groupings to choose between recommended alternative code segments. For example, if more than one code segment(s) can be recommended, and the code segment(s) belong to respective logical groupings, the recommendation unit 104 can detect the final state probabilities c of each potential logical grouping that includes a potential recommended alternative code segment. The recommendation unit 104 first determines whether each final state probability c is above a minimum threshold value. Any code segment whose logical grouping has final state probability c below the minimum threshold value is not selected as an alternative code segment. For each code segment(s) that belongs to a logical grouping whose final state probability c is greater than the minimum threshold probability, the recommendation unit 104 compares the final state probabilities ε, and selects the code segment from the logical grouping with the higher final state probability c as an alternative code segment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
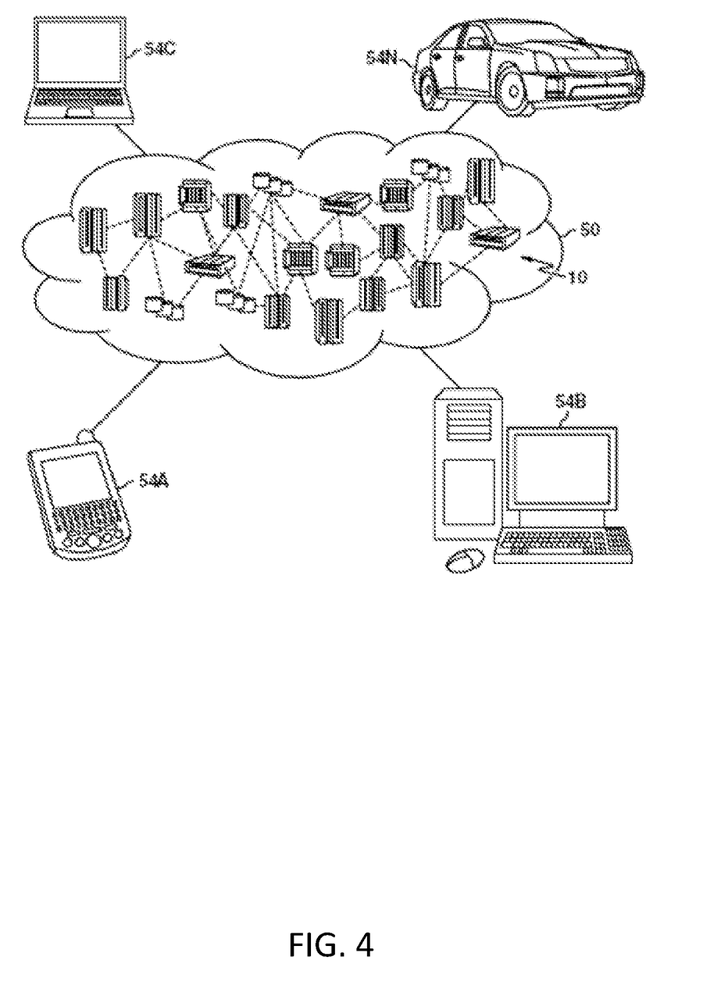
FIG. 4 illustrates a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
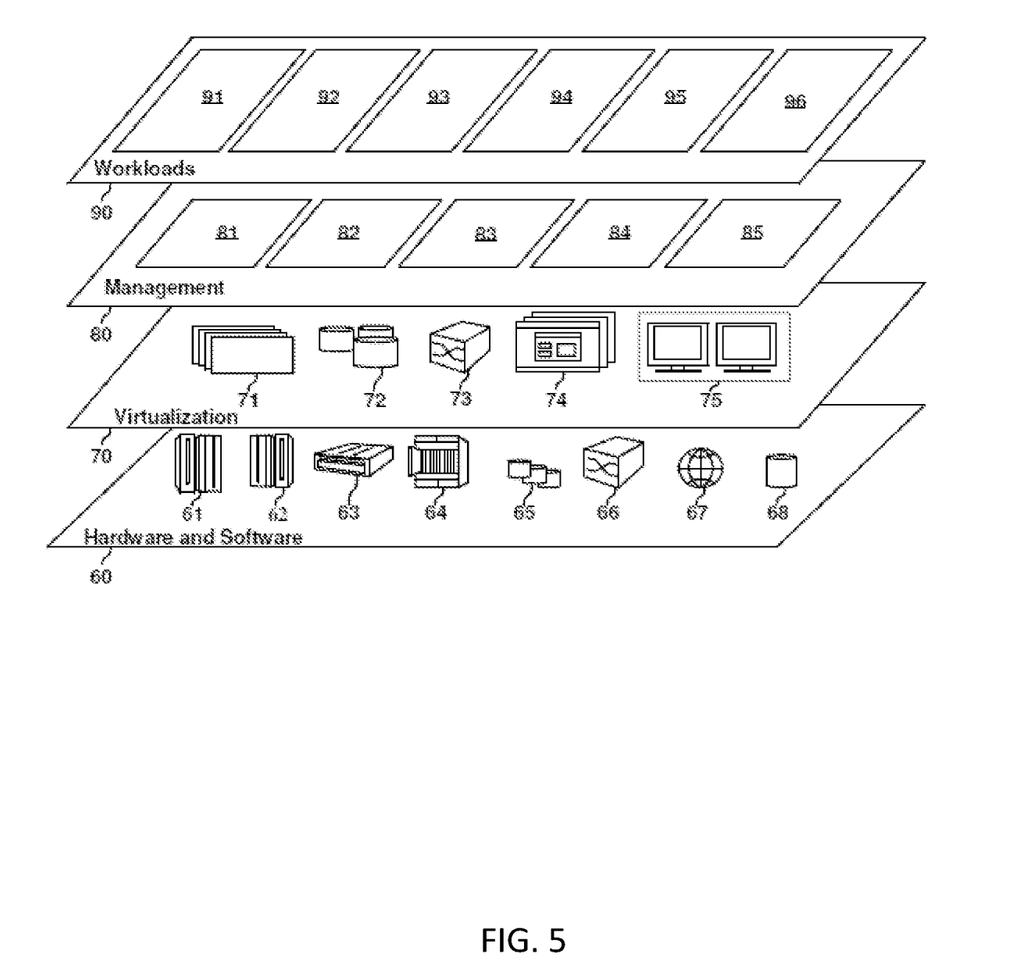
FIG. 5 illustrates abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and determining an optimum setoff code segments to modify 96.

Figure 6:
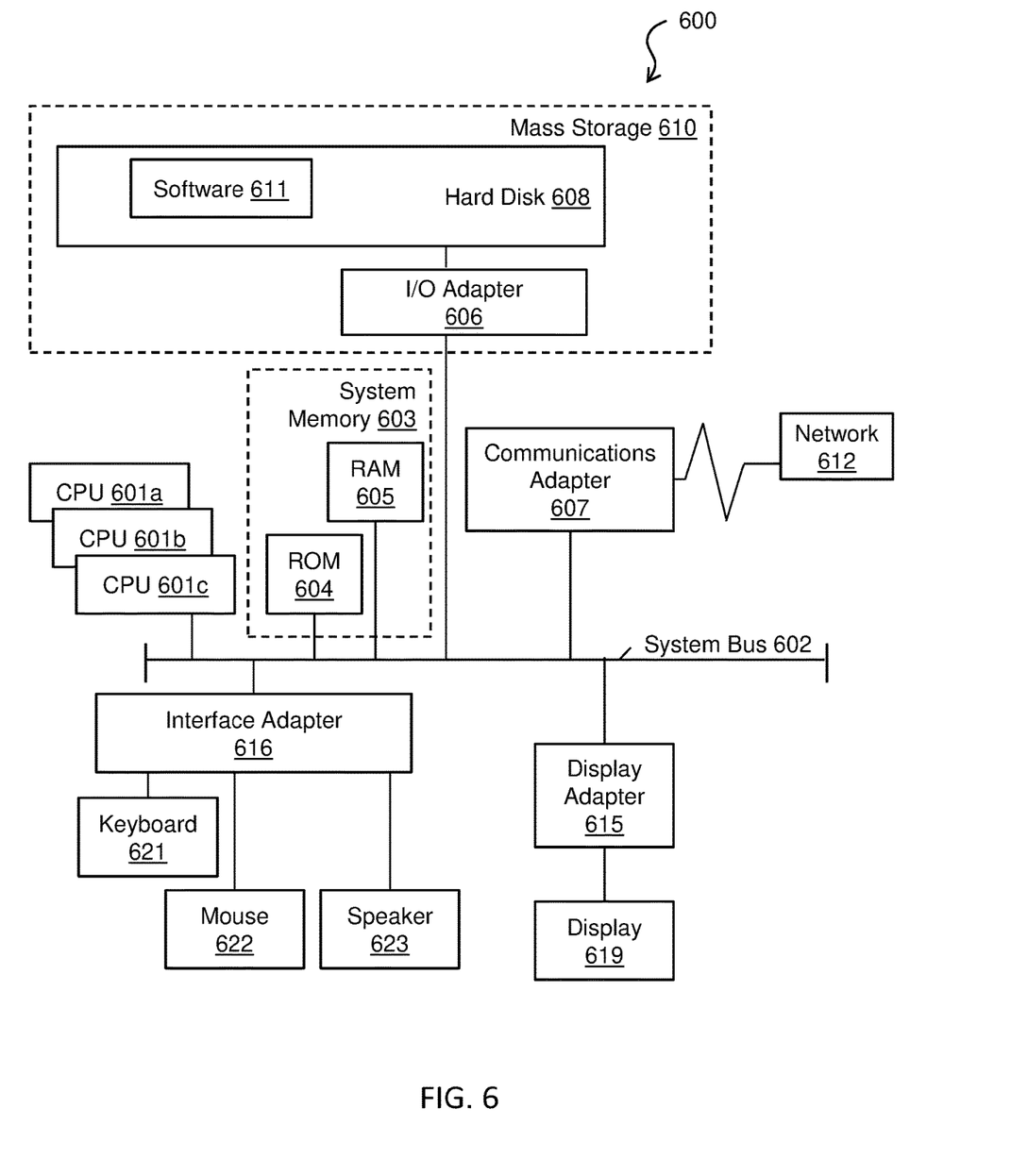
FIG. 6 illustrates a block diagram of a computer system for use in implementing one or more embodiments of the present invention.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 508 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a processor, a notification that a first logical grouping of code segments of a software application is being changed;
    comparing, by the processor, the first logical grouping to a second logical grouping of code segments from a change history of the software application, wherein the first logical grouping and the second logical grouping both relate to resolving a common software application issue, wherein the first logical grouping and the second logical grouping include at least one common code segment, and wherein comparing the first logical grouping to the second logical grouping comprises:
        identifying the second logical grouping in a dependency graph derived from the change history;
        matching one or more code segments from the first logical grouping to the second logical grouping; and
        determining whether a threshold number of code segments from the first logical grouping match the second logical grouping;
    identifying, by the processor, a first code segment of the first logical grouping that is different from a second code segment of the second logical grouping;
    determining, by the processor, that given the first code segment is changed a probability that the second code segment has been changed is greater than a threshold value;
    sending, by the processor, a notification based on the probability that the second code segment has been changed being greater than the threshold value; and
    changing the second logical grouping of code segments instead of the first logical grouping of code segments.

2. The computer implemented method of claim 1, wherein the notification is received from a software version control system.

3. The computer-implemented method of claim 1, wherein identifying the first code segment of first logical grouping that differs from the second code segment of the second logical grouping comprises comparing a respective code identifier of the first code segment and the second code segment.

4. The computer-implemented method of claim 1, further comprising:
    inputting a probability that each respective code segment of the first logical grouping is changed and a probability that each respective code segment of the second logical grouping is changed into a Markov model;
    extracting a first eigenvector describing the first logical grouping and a second eigenvector describing the second logical grouping from a Markov matrix built from the Markov model; and
    comparing a distance between the first eigenvector and the second eigenvector.

5. The computer-implemented method of claim 4, wherein comparing the distance comprises performing a cosine similarity algorithm on the first and second eigenvectors.

6. A system comprising:
    a memory having computer readable instructions; and
    one or more processors for executing the computer readable instructions, the computer readable instructions controlling the one or more processors to perform operations comprising:
        receiving a notification that a first logical grouping of code segments of a software application is being changed;
        comparing the first logical grouping to a second logical grouping of code segments from a change history of the software application, wherein the first logical grouping and the second logical grouping both relate to resolving a common software application issue, and wherein the first logical grouping and the second logical grouping include at least one common code segment, and wherein comparing the first logical grouping to the second logical grouping comprises:
            identifying the second logical grouping in a dependency graph derived from the change history;
            matching one or more code segments from the first logical grouping to the second logical grouping; and
            determining whether a threshold number of code segments from the first logical grouping match the second logical grouping;
        identifying a first code segment of the first logical grouping that is different from a second code segment of the second logical grouping;
        determining, by the processor, that given the first code segment is changed a probability that the second code segment has been changed is greater than a threshold value;
        sending a notification based on the probability that the second code segment has been changed being greater than the threshold value; and
        changing the second logical grouping of code segments instead of the first logical grouping of code segments.

7. The system of claim 6, wherein the notification is received from a software version control system.

8. The system of claim 6, wherein identifying the first code segment of first logical grouping that differs from the second code segment of the second logical grouping comprises comparing a respective code identifier of the first code segment and the second code segment.

9. The system of claim 6, further comprising:
    inputting a probability that each respective code segment of the first logical grouping is changed and a probability that each respective code segment of the second logical grouping is changed into a Markov model;
    extracting a first eigenvector describing the first logical grouping and a second eigenvector describing the second logical grouping from a Markov matrix built from the Markov model; and
    comparing a distance between the first eigenvector and the second eigenvector.

10. The system of claim 6, wherein comparing the distance comprises performing a cosine similarity algorithm on the first and second eigenvectors.

11. A computer program product comprising a computer readable storage medium having program instructions embodied therewith, the program instructions executable by a processor to cause the processor to perform operations comprising:
- receiving a notification that a first logical grouping of code segments of a software application is being changed;
- comparing the first logical grouping to a second logical grouping of code segments from a change history of the software application, wherein the first logical grouping and the second logical grouping both relate to resolving a common software application issue, and wherein the first logical grouping and the second logical grouping include at least one common code segment, and wherein comparing the first logical grouping to the second logical grouping comprises:
    - identifying the second logical grouping in a dependency graph derived from the change history;
    - matching one or more code segments from the first logical grouping to the second logical grouping; and
    - determining whether a threshold number of code segments from the first logical grouping match the second logical grouping;
- identifying a first code segment of the first logical grouping is different from a second code segment of the second logical grouping;
- determining, by the processor, that given the first code segment is changed a probability that the second code segment has been changed is greater than a threshold value;
- sending a notification based on the probability that the second code segment has been changed being greater than the threshold value; and
- changing the second logical grouping of code segments instead of the first logical grouping of code segments.

12. The computer program product of claim 11, wherein the notification is received from a software version control system.

13. The computer program product of claim 11, wherein identifying the first code segment of first logical grouping that differs from the second code segment of the second logical grouping comprises comparing a respective code identifier of the first code segment and the second code segment.

14. The computer program product of claim 11, further comprising:
- inputting a probability that each respective code segment of the first logical grouping is changed and a probability that each respective code segment of the second logical grouping is changed into a Markov model;
- extracting a first eigenvector describing the first logical grouping and a second eigenvector describing the second logical grouping from a Markov matrix built from the Markov model; and
- comparing a distance between the first eigenvector and the second eigenvector.

15. The computer program product of claim 11, wherein comparing the distance comprises performing a cosine similarity algorithm on the first and second eigenvectors.

* * * * *